United States Patent
Chin et al.

(10) Patent No.: US 6,490,298 B1
(45) Date of Patent: Dec. 3, 2002

(54) APPARATUS AND METHODS OF MULTIPLEXING DATA TO A COMMUNICATION CHANNEL

(75) Inventors: Amanda L. Chin, Fremont, CA (US); Paul E. Haskell, Saratoga, CA (US); William L. Helms, Rollinsville, CO (US)

(73) Assignee: Harmonic Inc., Sunnyvale, CA (US)

(*) Notice: Subject to any disclaimer, the term of this patent is extended or adjusted under 35 U.S.C. 154(b) by 0 days.

(21) Appl. No.: 09/258,508

(22) Filed: Feb. 26, 1999

(51) Int. Cl.[7] ............................................. H04J 3/04
(52) U.S. Cl. ................... 370/532; 370/537; 370/395.4; 370/232; 370/235
(58) Field of Search .................... 370/232, 235, 370/395.61, 395.64, 395.65, 532, 537, 538, 395.4, 395.43

(56) References Cited

U.S. PATENT DOCUMENTS

| | | | |
|---|---|---|---|
| 4,644,533 A | 2/1987 | Braff et al. | 370/94 |
| 4,736,369 A | 4/1988 | Barzilai et al. | 370/94 |
| 4,769,811 A | 9/1988 | Eckberg et al. | 370/60 |
| 4,779,267 A | 10/1988 | Limb et al. | 370/94 |
| 4,852,089 A | 7/1989 | Berry et al. | 370/95 |
| 4,896,316 A | 1/1990 | Lespagnol et al. | 370/60 |
| 4,964,119 A | 10/1990 | Endo et al. | 370/60 |
| 5,029,164 A | 7/1991 | Goldstein et al. | 370/95.1 |
| 5,166,930 A | 11/1992 | Braff et al. | 370/94.1 |
| 5,231,633 A | 7/1993 | Hluckyj et al. | 370/94.1 |
| 5,278,828 A | 1/1994 | Chao | 370/85.6 |
| 5,442,730 A | 8/1995 | Bigus | 395/22 |
| 5,506,844 A | 4/1996 | Rao | 370/84 |
| 5,673,393 A | 9/1997 | Marshall | 395/200.04 |
| 5,781,532 A | 7/1998 | Kanata | 370/236 |
| 5,826,080 A | * 10/1998 | Dworzecki | 370/355 |
| 5,831,980 A | 11/1998 | Varma et al. | 370/395 |
| 5,862,140 A | 1/1999 | Shen et al. | 370/468 |
| 5,987,031 A | * 11/1999 | Miller et al. | 370/236.1 |
| 6,018,527 A | * 1/2000 | Yin et al. | 370/395.41 |
| 6,373,818 B1 | * 4/2000 | Brassier et al. | 370/468 |
| 6,137,793 A | * 10/2000 | Gorman et al. | 370/394 |

FOREIGN PATENT DOCUMENTS

| | | | |
|---|---|---|---|
| EP | 0 201 252 B1 | 10/1991 | |
| EP | 0 491 489 A2 | 6/1992 | |
| EP | 0 847166 A1 | * 10/1998 | ........... H04L/12/56 |

OTHER PUBLICATIONS

"Comparison of Rate–Based Service Disciplines", by Hui Zhang and Srinivasan Keshav, Computer Science Division, University of California at Berkeley, CA 94720, dated 1991.

"VirtualClock: A New Traffic Control Algorithm for Packet Switching Networks", by Lixia Zhang, Xerox Palo Alto Research Center, SIGCOMM 1990 Symposium Communication Architecture & Protocols, Sep. 24–27, 1990, Philadelphia, PA, Computer Communication Review, vol. 20, No. 4, Sep. 1990.

* cited by examiner

Primary Examiner—Hassan Kizou
Assistant Examiner—Tim Spafford
(74) Attorney, Agent, or Firm—Fish & Richardson P.C.

(57) ABSTRACT

Apparatus and methods for multiplexing data received from a plurality of sources to a communication channel. Each of the sources is assigned to one of at least two scheduling layers based in part upon one or more bit rate characteristics of the sources.

148 Claims, 8 Drawing Sheets

APPARATUS AND METHODS OF MULTIPLEXING DATA TO A COMMUNICATION CHANNEL

BACKGROUND OF THE INVENTION

The invention relates to apparatus and methods of multiplexing data to a communication channel.

In a typical data network, a plurality of data sources deliver their respective data streams to various receivers over the same fixed bandwidth communication channel. A multiplexer receives the data streams from the sources and choreographs the injection of data into the communication channel. The multiplexer is typically designed to efficiently inject as much data into communication channel as possible, without exceeding the capacity of the channel. The data sources typically include encoders for compressing data before delivery to the multiplexer; the receivers decompress and reconstruct the original data signals from the compressed data streams. A data source may be characterized as either a constant bit rate (CBR) source or a variable bit rate (VBR) source: a fixed rate source injects data (bits) into a communication channel at a constant rate, whereas a variable rate source injects bits into a communication channel at a variable rate.

Transfer of information from the data sources is typically in the form of information packets. The multiplexer schedules data for output to the communication channel one packet at a time, and delivers the scheduled data packets to the channel as an output multiplex. Packet scheduling involves the assignment of a particular source to a timeslot in the output multiplex. A high-performance scheduling algorithm allows each of the sources to be assigned an arbitrary fraction of channel bandwidth, subject to the constraint that the sum of all source bit rates is less than or equal to the bit rate multiplex that they share. Real-time scheduling is desirable because it allows sources to change their bit rates frequently and on-the-fly. High-performance real-time scheduling of multiple sources often requires substantial hardware resources, with the computational complexity increasing with the output bit rate, the number of sources and the resolution with which the route of each source is specified.

SUMMARY OF THE INVENTION

The invention features apparatus and methods for multiplexing data received from a plurality of sources to a communication channel. In accordance with the invention, each of the sources is assigned to one of at least two scheduling layers, including a first layer and a second layer, based at least in part upon one or more bit rate characteristics of the sources.

Embodiments may include one or more of the following features.

Each of the sources may be assigned based at least in part on data transmission rates of the sources, bit rate precision levels of the sources or both. The sources may be assigned to the scheduling layers based upon a fixed assignment method that operates independently of changes in data transmission rates of the sources, or based upon a dynamic assignment method that responds to changes in data transmission rates of the sources. The number of sources assigned to the first layer may be fixed or variable.

In one embodiment, the first layer comprises an entry for each source assigned to the first layer and an entry representative of a source assigned to the second layer, and the second layer comprises an entry for each source assigned to the second layer. The sources represented by entries in the first layer are scheduled for output to the communication channel. The sources represented by entries in the first layer may be scheduled for output based upon a variable bit rate scheduling method. Sources with relatively high bit rates (with relatively high bit rate precision levels) preferably are assigned to the first layer. The sources represented by entries in the second layer are scheduled for assignment to the representative entry of the first layer. The sources represented by entries in the second layer preferably are scheduled sources for assignment to the representative entry of the first layer based upon a variable bit rate scheduling method.

In another embodiment, each of the sources is assigned to one of three or more scheduling layers, including the first layer, the second layer and a sequence of one or more lower layers, based at least in part on one or more bit rate characteristics of the sources. The second layer preferably comprises, in addition to an entry for each source assigned to the second layer, an entry representative of a source assigned to a first of the one or more lower layers, and each lower layer preferably comprises an entry for each source assigned to that lower layer and an entry representative of a source assigned to the next lower layer in the sequence of one or more lower layers. The sources represented by entries in that first lower layer preferably are scheduled for assignment to the representative entry of the second layer. In some embodiments, the first layer preferably comprises, in addition to the entry for each source assigned to the first layer and the entry representative of a source assigned to the second layer, a representative entry for each of the lower layers, and each lower layer preferably comprises an entry for each source assigned to that lower layer. Lower layer sources preferably are scheduled for assignment to the representative entries of the first layer.

In another embodiment, each of the sources is assigned to one of three or more scheduling layers, including the first layer, the second layer and a third layer, based at least in part on one or more bit rate characteristics of the sources. The first layer comprises an entry for each source assigned to the first layer. The second layer comprises an entry for each source assigned to the second layer. The third layer comprises an entry representative of a source assigned to the first layer and an entry representative of a source assigned to the second layer. Each of the sources preferably is assigned based at least in part on the data transmission rates of the sources, or on the bit rate precision levels of the sources. Sources with relatively high bit rates (or with relatively high bit rate precision levels) preferably are assigned to the first layer.

Each source preferably is assigned a data transmission rate and a bit rate precision level. In some embodiments, the same bit rate precision level is assigned to each source. In other embodiments, different bit rate precision levels are assigned to the sources. In a preferred embodiment, relatively high bit rate precision levels are assigned to audio sources, intermediate bit rate precision levels are assigned to video sources, and relatively low bit rate precision levels are assigned to data sources.

Among the advantages of the invention are the following.

The invention allows real-time scheduling using high performance scheduling methods, but with reduced computational requirements. Because each of the sources assigned to the first layer has a relatively high bit rate (or high bit rate precision level), the first layer sources typically may be scheduled with a course bit rate granularity. This reduces the computational load at the first layer without degrading the performance of the first layer sources (i.e., source performance is typically not degraded if it operates at 15.000 Mb/s rather than at 14.999 Mb/s, but its performance may be degraded if it operates at 1 kb/s).

The computational load at the lower (e.g., second) layer is reduced in several ways. The lower layer scheduler only need operate at the rate at which the first layer scheduler selects packets from the lower layer for output to the communication channel—a rate which may be a small fraction of the first layer packet rate. Further, the lower layer may only contain sources with a much smaller maximum bit rate than the first layer. This allows the use of scheduling methods characterized by a relatively fine bit rate granularity without increasing computational complexity. Sources may be assigned to layers depending on their bit rates and on their bit rate resolution requirements.

In addition, because the outputs of higher bit rate sources tend to be more regular than the outputs of lower bit rate sources, the invention might improve the overall multiplexer output regularity by separately scheduling the higher and lower bit rate sources.

The invention also reduces implementation complexity by separately scheduling high rate sources and low rate sources, or by separately scheduling fine rate granularity and coarse rate granularity sources, or both.

Other features and advantages will become apparent from the following description, including the drawings and the claims.

DESCRIPTION OF THE PREFERRED EMBODIMENTS

Figure 1:
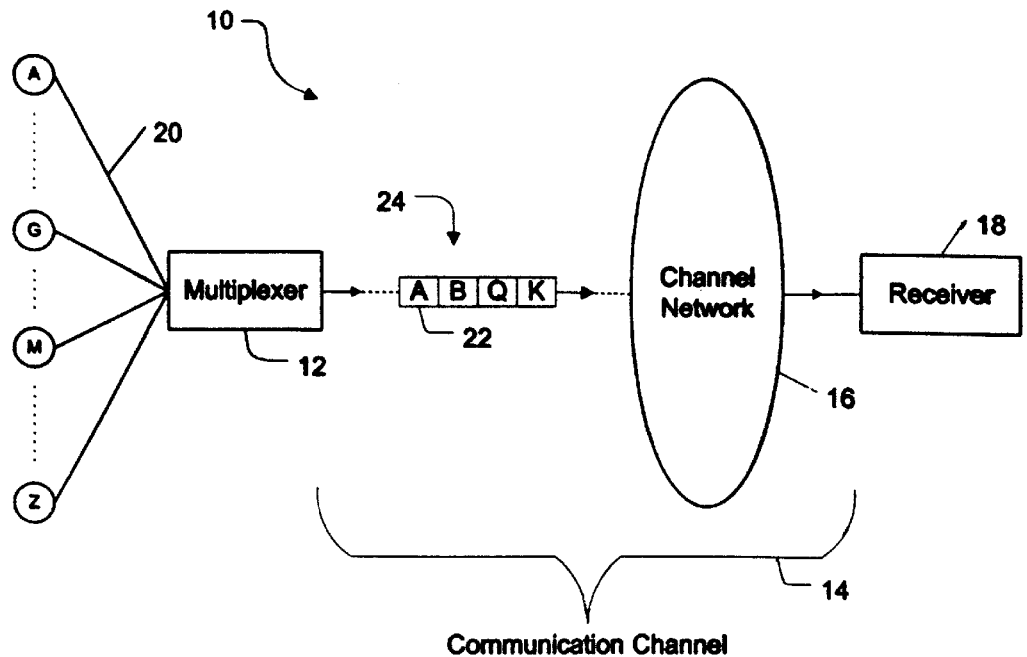
FIG. 1 is a block diagram of a communication network, including a plurality of sources, a multiplexer, a communication channel, and a receiver.

Referring to FIG. 1, a communication network 10 includes a plurality of data sources A–Z (e.g., video cameras), a multiplexer 12, a communication channel 14 which includes a channel network 16, and a receiver 18. Data sources A–Z typically include encoders configured to compress original data using a compression algorithm based on a standard protocol. In one embodiment, variable bit rate (VBR) encoding techniques, such as the MPEG-1 or the MPEG-2 encoding standards, are used to reduce the amount of data needed by receiver 18 to reconstruct the original data signals. Other variable bit rate encoding techniques, as well as constant bit rate encoding techniques, may be used. The encoded data is delivered to multiplexer 12 as a series of data streams 20. Multiplexer 12 assigns to each source A–Z a time slot 22 in an output multiplex 24. Output multiplex 24 may be immediately broadcast to receiver 18 over channel network 16 or stored in memory for broadcast at a later time.

As explained below, multiplexer 12 is configured assign each source A–Z to a time slot 22 in real-time to achieve efficient bandwidth utilization with reduced computational complexity and without sacrificing source performance.

Figure 2A:
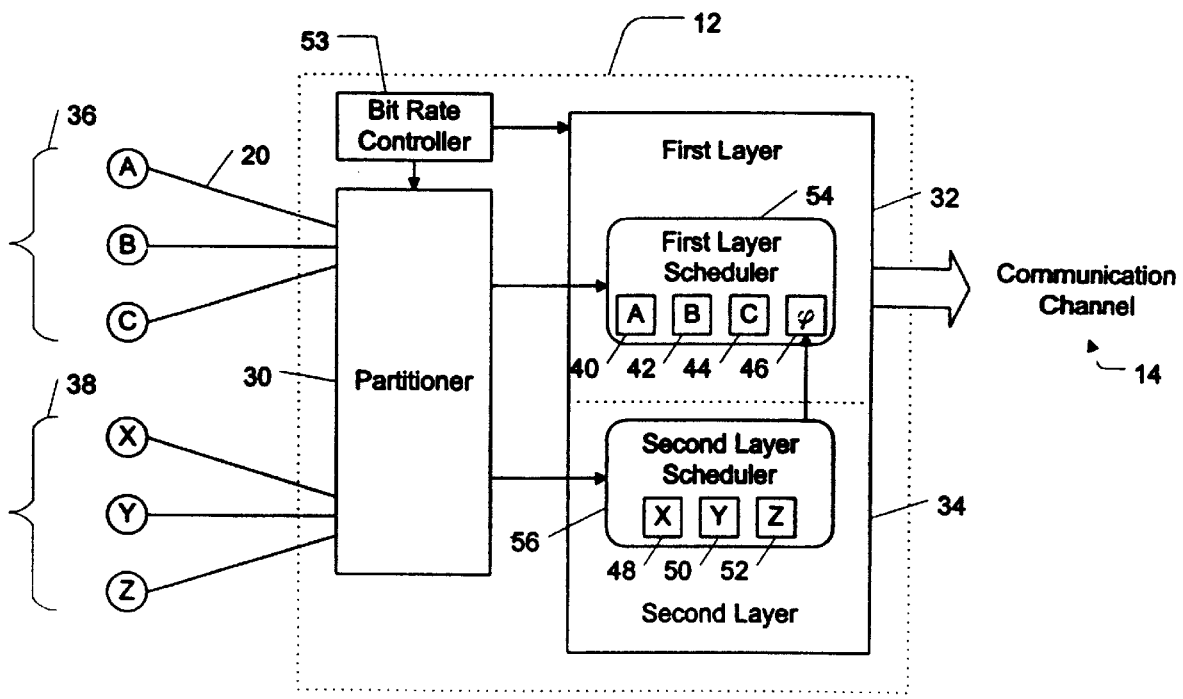
FIG. 2A is a block diagram of a multiplexer.

Referring to FIG. 2A, in one embodiment, multiplexer 12 includes a partitioner 30 that receives data streams 20 from sources A–C and X–Z and assigns each source to one of at least two scheduling layers, including a first layer 32 and a second layer 34, based at least in part on one or more bit rate characteristics of the sources—e.g., the data transmission rates of the sources, or the bit rate precision levels (also referred to as the bit rate accuracy or the bit rate granularity) of the sources, or both. For example, in one embodiment, sources characterized by a relatively high data transmission rate (bit rate) are assigned to first layer 32, and the remaining sources are assigned to second layer 34. In another embodiment, sources characterized by relatively high bit rate precision levels are assigned to first layer 32, and the remaining sources are assigned to second layer 34. The number of sources assigned to first layer 32 is restricted to achieve manageable implementation complexity. The number of sources assigned to first layer 32 may be fixed or may vary over time.

In FIG. 2A, partitioner 30 has partitioned sources A–, X–Z into two groups 36, 38, with sources A–C assigned to first layer 32 and sources X–Z assigned to second layer 34. First layer 32 includes an entry 40–44 for each source assigned to first layer 32 and an entry 46 (ϕ) which is representative of a source assigned to second layer 34. Thus, entry 46 (ϕ) serves as an escape code for all of the second layer sources. Second layer 34 includes an entry 48–52 for each source assigned to second layer 34.

A bit rate controller 53 specifies the bit rates and the bit rate precision levels of sources A–C, X–Z, and delivers this information to partitioner 30 and to the schedulers (discussed below). In one embodiment, bit rate controller 53 assigns the same bit rate precision to each source. In another embodiment, bit rate controller 53 assigns different bit rate precision levels to the sources. For example, audio sources maybe assigned relatively high bit rate precision levels, video sources may be assigned intermediate bit rate precision levels, and data sources may be assigned relatively low bit rate precision levels.

Multiplexer 12 also includes a first layer scheduler 54 and a second layer scheduler 56. First layer scheduler 54 is configured to schedule the sources represented by entries in first layer 32 for output to communication channel 14. In one embodiment, first layer scheduler 54 schedules sources for output based upon a variable bit rate scheduling method. For example, first layer scheduler may schedule sources based on the virtual clock method, the round robin method, or the first-in-first-out (FIFO) method, as described in Zhang et al., "Comparison of Rate-Based Service Disciplines," SIGCOMM '91, vol. 21:4, pp. 113–121 (1991), which is incorporated herein by reference. Second layer scheduler 56 is configured to schedule sources represented by entries in second layer 34 for assignment to representative entry 46 (ϕ) of first layer 32. In one embodiment, second layer scheduler 56 schedules sources for output based upon a variable bit rate scheduling method, such as one of the methods mentioned in connection with first layer scheduler 54.

In one embodiment, partitioner 30 is configured to assign sources A–C, X–Z to scheduling layers 32, 34 based upon a fixed assignment method that operates independently of changes in the data transmission rates of the sources. For example, sources that are known in advance to be characterized by a relatively high bit rate may be permanently assigned to first layer 32, and all of the remaining sources may be permanently assigned to second layer 34.

In another embodiment, partitioner 30 is configured to assign sources A–C, X–Z to scheduling layers 32, 34 based upon a dynamic assignment method that responds to changes in the data transmission rates of the sources. For example, partitioner 30 may dynamically assign sources with the highest bit rates to first layer 32 and the remaining sources to second layer 34. Thus, the assignments of each of the sources may change over time depending upon changes in the bit rates of each of the sources. In one embodiment, the number of sources assigned to first layer 32 is fixed and only the sources with the highest bit rates are assigned to first layer 32. In another embodiment, sources with bit rates over a selected threshold value are assigned to first layer 32, in which the number of sources assigned to first layer 32 may vary over time. In another embodiment, a sufficient number of the highest bit rate sources are assigned to first layer 32 so that the sum of the bit rates of the first layer sources just exceeds a threshold value.

Figure 2B:
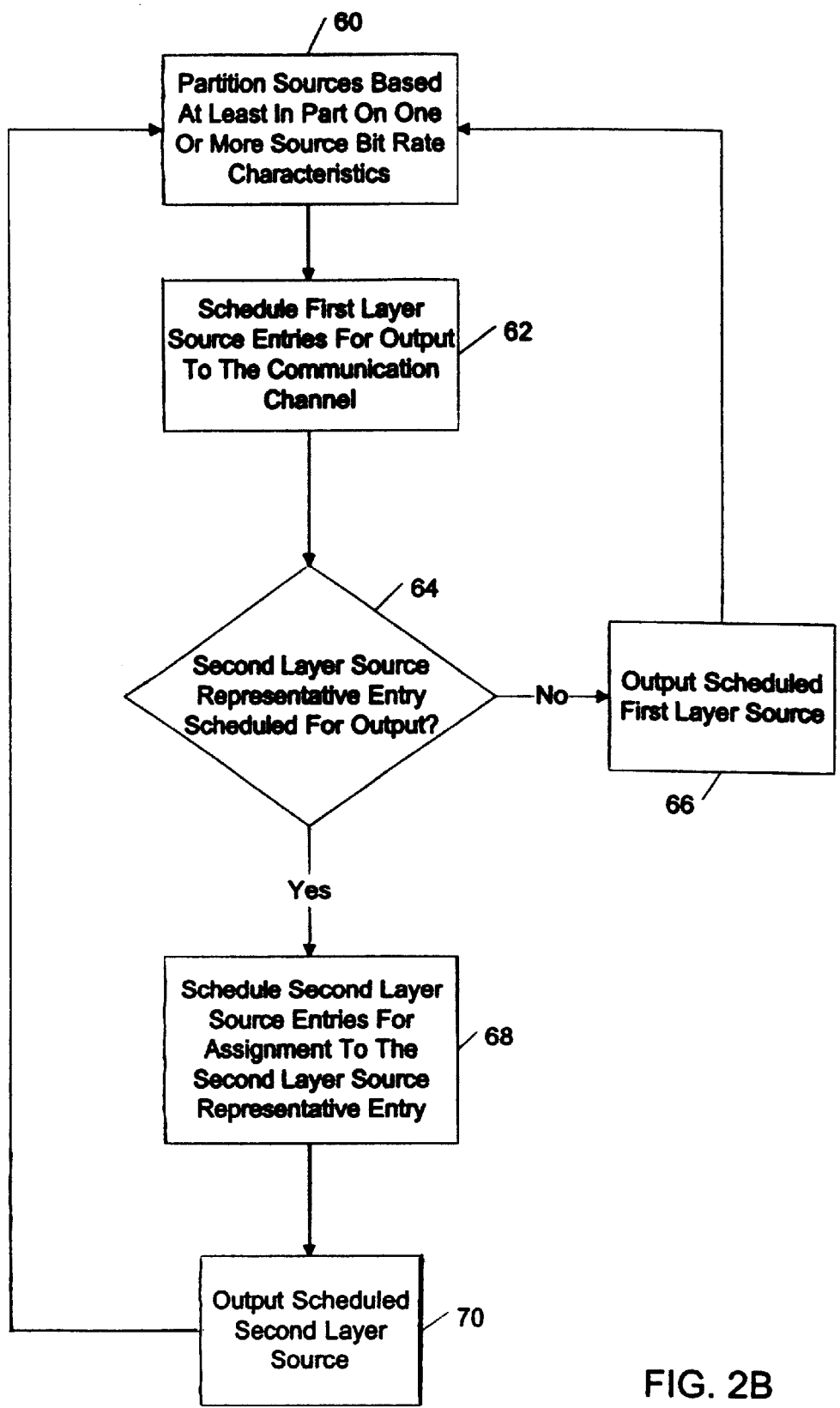
FIG. 2B is a flow diagram of a method of multiplexing data to a communication channel.

As shown in FIG. 2B, the multiplexer of FIG. 2A is operable to choreograph the multiplexing of data to communication channel 14 as follows. Partitioner 30 partitions sources based at least upon one or more bit rate characteristics of the sources (step 60). First layer scheduler 54 schedules first layer sources entries 40–46 for output to communication channel 14 (step 62). If entry 46 ($\phi$), which is representative of a source assigned to second layer 34, is not scheduled for output (step 64), the scheduled first layer source is output to communication channel 14 (step 66). Otherwise, second layer scheduler 56 schedules second layer source entries 48–52 for assignment to second layer source representative entry 46 ($\phi$) (step 68), and the scheduled second layer source is output to communication channel 14 (step 70).

As explained above, by separately scheduling the higher and lower bit rate (or bit rate precision level) sources, the multiplexer of FIG. 2A reduces the computational loads at the first and second layers without sacrificing source performance.

Other embodiments are within the scope of the claims.

Figure 3A:
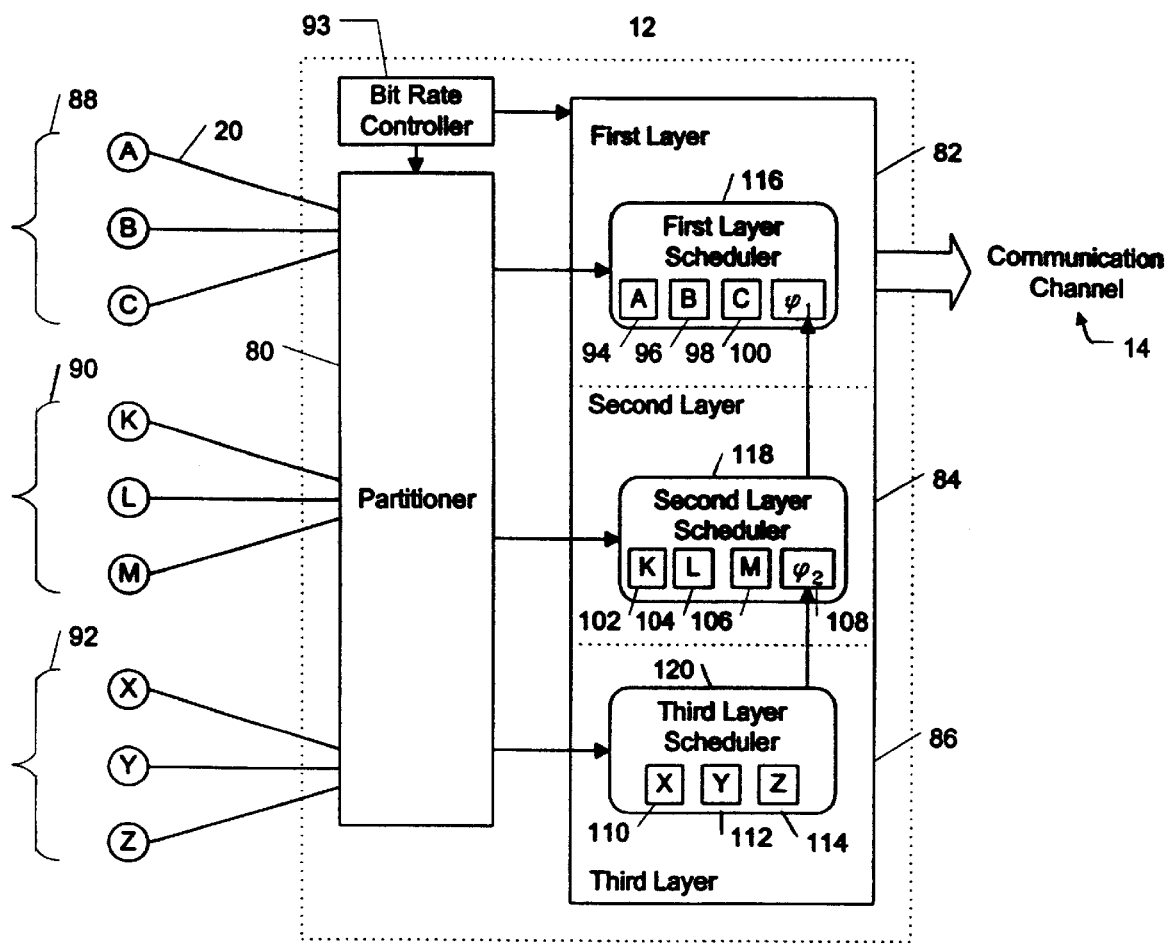
FIG. 3A is a block diagram of a multiplexer.

Referring to FIG. 3A, in one embodiment, multiplexer 12 includes a partitioner 80 which receives data streams 20 from sources A–C, K–M and X–Z and assigns each source to one of at least three scheduling layers, including a first layer 82, a second layer 84 and a third layer 86, based at least in part on one or more bit rate characteristics of the sources—e.g., the data transmission rates of the sources, or the bit rate precision levels of the sources, or both. For example, in one embodiment, sources characterized by the highest data transmission rates (bit rate) are assigned to first layer 82, sources with intermediate bit rates are assigned to second layer 84, and the remaining sources are assigned to third layer 86. In another embodiment, sources characterized by the highest bit rate precision levels are assigned to first layer 82, sources with intermediate bit rate precision levels are assigned to second layer 84, and the remaining sources are assigned to third layer 86. The numbers of sources assigned to first layer 82 and second layer 84 may be restricted to achieve manageable implementation complexity. The number of sources assigned to first layer 82 may be fixed or may vary over time.

In FIG. 3A, partitioner 80 has partitioned sources A–C, K–M, X–Z into three groups 88, 90, 92, with sources A–C assigned to first layer 82, sources K–M assigned to second layer 84, and sources X–Z assigned to third layer 86.

A bit rate controller 93 specifies the bit rates and the bit rate precision levels of sources A–C, X–Z, and delivers this information to partitioner 30 and to the schedulers (discussed below). In one embodiment, bit rate controller 93 assigns the same bit rate precision to each source. In another embodiment, bit rate controller 93 assigns different bit rate precision levels to the sources. For example, audio sources maybe assigned relatively high bit rate precision levels, video sources may be assigned intermediate bit rate precision levels, and data sources may be assigned relatively low bit rate precision levels.

First layer 82 includes an entry 94–98 for each source assigned to first layer 82 and an entry 100 ($\phi_1$) which is representative of a source assigned to second layer 84. Thus, entry 100 ($\phi_1$) serves as an escape code for all of the second and third layer sources. Second layer 84 includes an entry 102–106 for each source assigned to second layer 84 and an entry 108 ($\phi_2$) which is representative of a source assigned to third layer 86. Entry 108 ($\phi_2$) therefore serves an escape code for all of the third layer sources. Third layer 86 includes an entry 110–114 for each source assigned to third layer 86.

Multiplexer 12 also includes a first layer scheduler 116, a second layer scheduler 118, and a third layer scheduler 120. First layer scheduler 116 is configured to schedule the sources represented by entries in first layer 82 for output to communication channel 14. In one embodiment, first layer scheduler 116 schedules sources for output based upon a variable bit rate scheduling method. For example, first layer scheduler may schedule sources based on the virtual clock method, the round robin method, or the first-in-first-out (FIFO) method (mentioned above). Second layer scheduler 118 is configured to schedule sources represented by entries in second layer 84 for assignment to representative entry 100 ($\phi_1$) of first layer 82. In one embodiment, second layer scheduler 118 schedules sources for output based upon a variable bit rate scheduling method, such as one of the methods mentioned in connection with first layer scheduler 116. Third layer scheduler 120 is configured to schedule sources represented by entries 110–114 in third layer 86 for assignment to representative entry 108 ($\phi_2$) of second layer 84. In one embodiment, third layer scheduler 120 schedules sources for output based upon a variable bit rate scheduling method, such as one of the methods mentioned above in connection with first layer scheduler 116.

In one embodiment, partitioner 80 is configured to assign sources A–C, K–M, X–Z to scheduling layers 82–86 based upon a fixed assignment method that operates independently of changes in the data transmission rates of the sources. For example, sources that are known in advance to be characterized by a relatively high bit rate may be permanently assigned to first layer 82, sources with intermediate bit rates may be permanently assigned to second layer 84, and all of the remaining sources may be permanently assigned to third layer 86.

In another embodiment, partitioner 80 is configured to assign the sources to the scheduling layer based upon a dynamic assignment method that responds to changes in the data transmission rates of the sources. For example, partitioner 80 may dynamically assign sources with the highest bit rates to first layer 82, sources with intermediate bit rates to second layer 84, and the remaining sources to third layer 86. Thus, the assignments of each of the sources may change over time depending upon changes in the bit rates of each of the sources. In one embodiment, the numbers of sources assigned to first layer 82 and second layer 84 are fixed. In another embodiment, sources with bit rates over a selected threshold value are assigned to first layer 82 and sources with bit rates within an intermediate range are assigned to second layer 84; in which case the numbers of sources assigned to first layer 82 and second layer 84 may vary over time. In another embodiment, a sufficient number of the highest bit rate sources are assigned to first layer 82 so that the sum of the bit rates of the first layer sources just exceeds a threshold value.

Figure 3B:
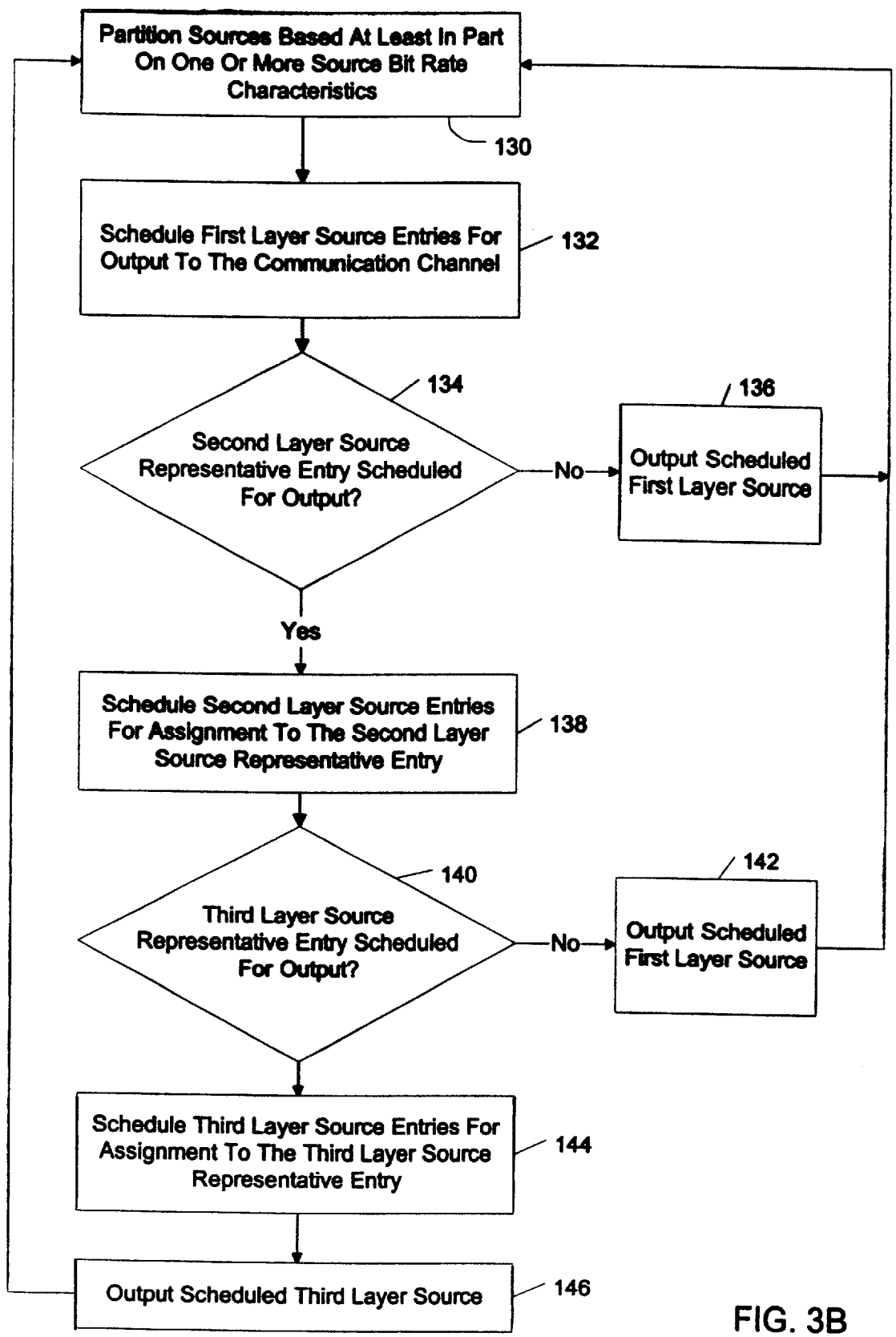
FIG. 3B is a flow diagram of a method of multiplexing data to a communication channel.

As shown in FIG. 3B, the multiplexer of FIG. 3A is operable to choreograph the multiplexing data to communication channel 14 as follows. Partitioner 80 partitions sources based at least upon one or more bit rate characteristics of the sources (step 130). First layer scheduler 116 schedules first layer sources entries 94–100 for output to communication channel 14 (step 132). If entry 100 ($\phi_1$), which is representative of a source assigned to second layer 84, is not scheduled for output (step 134), the scheduled first layer source is output to communication channel 14 (step 136). Otherwise, second layer scheduler 118 schedules second layer source entries 102–108 for assignment to second layer source representative entry 100 ($\phi_1$) (step 138). If entry 108 ($\phi_2$), which is representative of a source assigned to third layer 86, is not scheduled for output (step 140), the scheduled second layer source is output to communication channel 14 (step 142). Otherwise, third layer scheduler 120 schedules third layer source entries 110–114 for assignment to second layer source representative entry 108 ($\phi_2$) (step 144), and the scheduled third layer source is output to communication channel 14 (step 146).

In this embodiment, source scheduling is relatively simple to implement. This embodiment also enables managers to finely control route geometry to different sources.

Figure 4A:
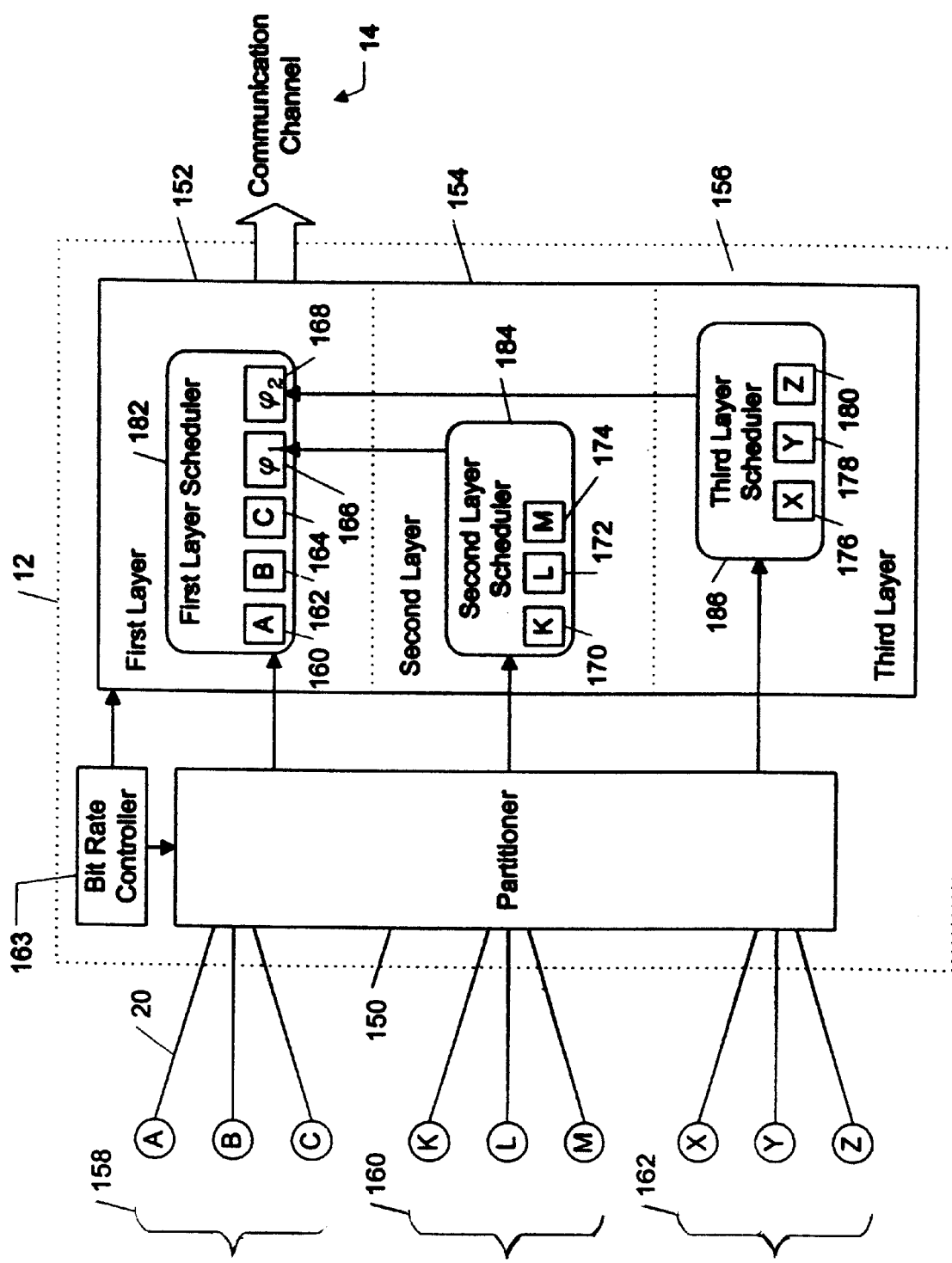
FIG. 4A is a block diagram of a multiplexer.

Referring to FIG. 4A, in another embodiment, multiplexer 12 includes a partitioner 150 which receives data streams 20 from sources A–C, K–M and X–Z and assigns each source to one of at least three scheduling layers, including a first layer 152, a second layer 154 and a third layer 156, based at least in part on one or more bit rate characteristics of the sources—e.g., the data transmission rates of the sources, or the bit rate precision levels of the sources, or both. For example, in one embodiment, sources characterized by the highest data transmission rates (bit rate) are assigned to first layer 152, sources with intermediate bit rates are assigned to second layer 154, and the remaining sources are assigned to third layer 156; alternatively, sources characterized by the highest data transmission rates may be assigned to first layer 152, and the remaining sources may be assigned to second layer 154 and third layer 156 based upon one or more criteria which may or may not depend upon source bit rate (e.g., source bit rate precision levels). In another embodiment, sources characterized by the highest bit rate precision levels are assigned to first layer 152, sources with intermediate bit rate precision levels are assigned to second layer 154, and the remaining sources are assigned to third layer 156; alternatively, sources characterized by the highest bit rate precision levels may be assigned to first layer 152, and the remaining sources may be assigned to second layer 154 and third layer 156 based upon one or more criteria which may or may not depend upon source bit rate precision levels (e.g., source bit rate). The numbers of sources assigned to first layer 152 may be restricted to achieve manageable implementation complexity. The number of sources assigned to first layer 152 may be fixed or may vary over time.

In FIG. 4A, partitioner 150 has partitioned sources A–C, K–M, X–Z into three groups 158, 30 160, 162, with sources A–C assigned to first layer 152, sources K–M assigned to second layer 154, and sources X–Z assigned to third layer 156.

A bit rate controller 163 specifies the bit rates and the bit rate precision levels of sources A–C, X–Z, and delivers this information to partitioner 30 and to the schedulers (discussed below). In one embodiment, bit rate controller 163 assigns the same bit rate precision to each source. In another embodiment, bit rate controller 163 assigns different bit rate precision levels to the sources. For example, audio sources maybe assigned relatively high bit rate precision levels, video sources may be assigned intermediate bit rate precision levels, and data sources may be assigned relatively low bit rate precision levels.

First layer 152 includes an entry 160–164 for each source assigned to first layer 152, an entry 166 ($\phi_1$) which is representative of a source assigned to second layer 154, and an entry 168 ($\phi_2$) which is representative of a source assigned to third layer 156. Second layer 154 includes an entry 170–174 for each source assigned to second layer 154. Third layer 156 includes an entry 176–180 for each source assigned to third layer 156.

Multiplexer 12 also includes a first layer scheduler 182, a second layer scheduler 184, and a third layer scheduler 186. First layer scheduler 182 is configured to schedule the sources represented by entries in first layer 152 for output to communication channel 14. In one embodiment, first layer scheduler 182 schedules sources for output based upon a variable bit rate scheduling method. For example, first layer scheduler 182 may schedule sources based on the virtual clock method, the round robin method, or the first-in-first-out (FIFO) method (mentioned above). Second layer scheduler 184 is configured to schedule sources represented by entries in second layer 154 for assignment to representative entry 166 ($\phi_1$) of first layer 152. In one embodiment, second layer scheduler 184 schedules sources for output based upon a variable bit rate scheduling method, such as one of the methods mentioned in connection with first layer scheduler 182. Third layer scheduler 186 is configured to schedule sources represented by entries in third layer 156 for assignment to representative entry 168 ($\phi_2$) of first layer 152. In one embodiment, third layer scheduler 186 schedules sources for output based upon a variable bit rate scheduling method, such as one of the methods discussed above in connection with first layer scheduler 182.

In one embodiment, partitioner 150 is configured to assign sources A–C, K–M, X–Z to scheduling layers 152–156 based upon a fixed assignment method that operates independently of changes in the data transmission rates of the sources. For example, sources that are known in advance to be characterized by a relatively high bit rate may be permanently assigned to first layer 152, and all of the remaining sources may be permanently assigned to second layer 154 and third layer 156, with the division of sources between second layer 154 and third layer 156 being 5 determined by one or more factors which may or may not depend upon source bit rate.

In another embodiment, partitioner 150 is configured to assign sources A–C, K–M, X–Z to scheduling layers 152–156 based upon a dynamic assignment method that responds to changes in the data transmission rates of the sources. For example, partitioner 150 may dynamically assign sources with the highest bit rates to first layer 152, and partition the remaining sources between second layer 154 and third layer 156. Thus, the assignments of each of the sources may change over time depending upon changes in the bit rates of each of the sources. In one embodiment, the number of sources assigned to first layer 152 is fixed. In another embodiment, sources with bit rates over a selected threshold value are assigned to first layer 152; in which the case numbers of sources assigned to first layer 152, second layer 154 and third layer 156 may vary over time. In another embodiment, a sufficient number of the highest bit rate sources are assigned to first layer 152 so that the sum of the bit rates of the first layer sources just exceeds a threshold value.

Figure 4B:
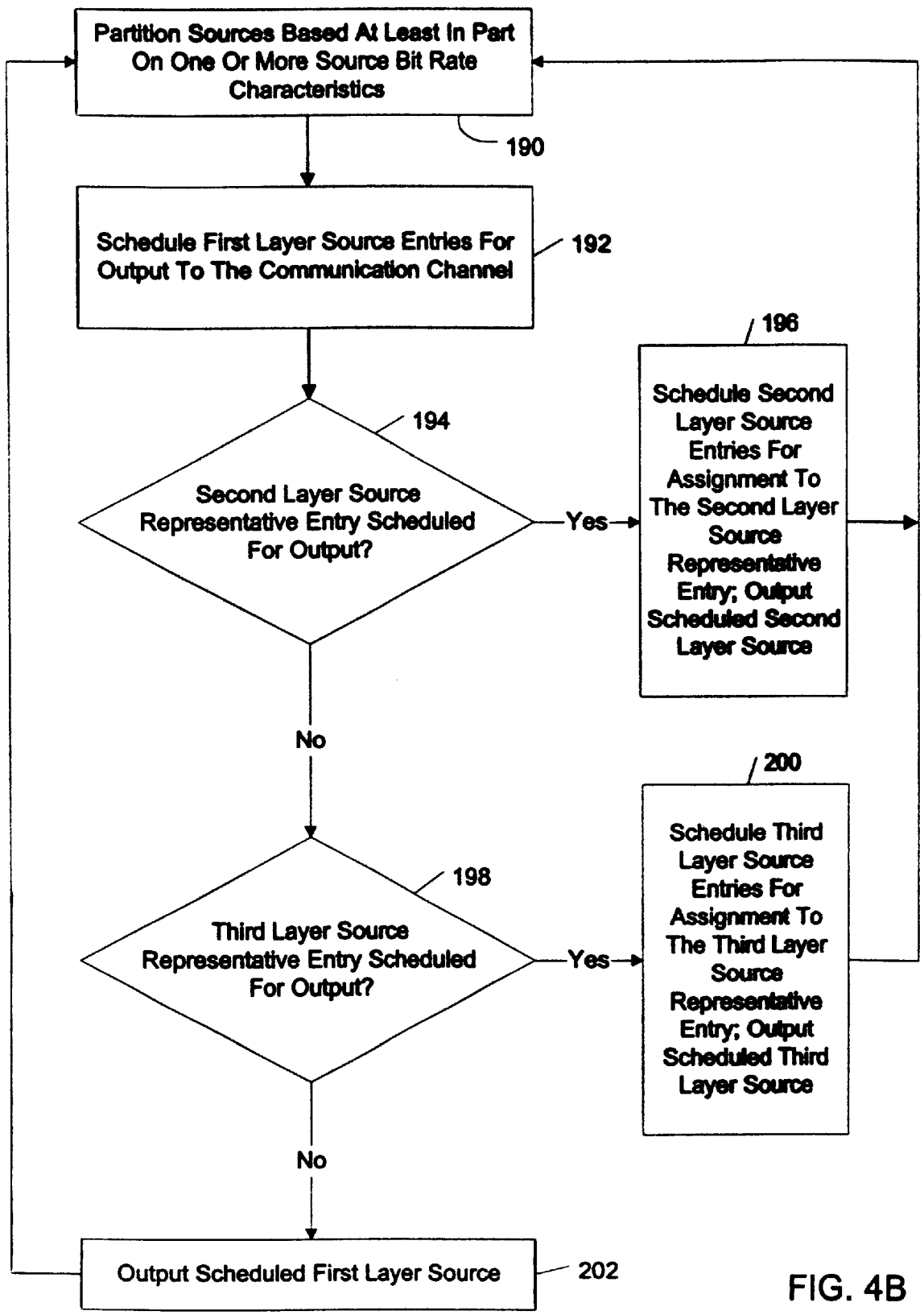
FIG. 4B is a flow diagram of a method of multiplexing data to a communication channel.

As shown in FIG. 4B, the multiplexer of FIG. 4A is operable to choreograph the multiplexing data to communication channel 14 as follows. Partitioner 150 partitions sources based at least upon one or more bit rate characteristics of the sources (step 190). First layer scheduler 182 schedules first layer sources entries 160–168 for output to communication channel 14 (step 1192). If entry 166 ($\phi_1$), which is representative of a source assigned to second layer 154, is scheduled for output (step 194), second layer scheduler 184 schedules second layer source entries 170–174 for assignment to second layer source representative entry 166 ($\phi_1$) and the scheduled second layer source is output to communication channel 14 (step 196). Otherwise, if entry 168 ($\phi_2$) which is representative of a source assigned to third layer 156, is scheduled for output (step 198), third layer scheduler 186 schedules third layer source entries 176–180 for assignment to third layer source representative entry 168 ($\phi_2$) and the scheduled third layer source is output to communication channel 14 (step 200). Otherwise, the scheduled first layer source is output to communication channel 14 (step 202).

Figure 5A:
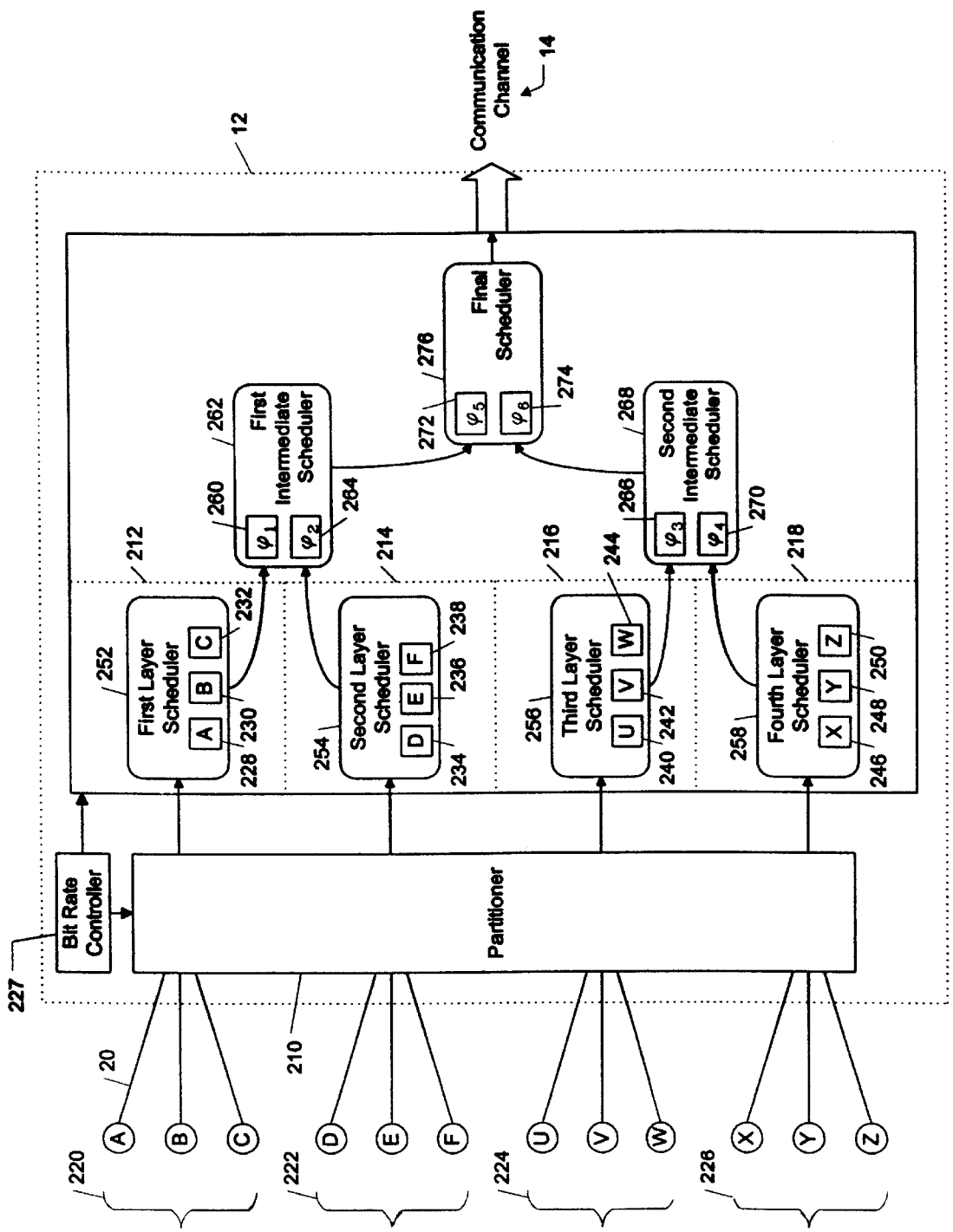
FIG. 5A is a block diagram of a multiplexer.

Referring to FIG. 5A, in yet another embodiment, multiplexer 12 includes a partitioner 210 which receives data streams 20 from sources A–C, D–F, U–W and X–Z and assigns each source to one of at least four scheduling layers, including a first layer 212, a second layer 214, a third layer 216 and a fourth layer 218, based at least in part on one or more bit rate characteristics of the sources—e.g., the data transmission rates of the sources, or the bit rate precision levels of the sources, or both. For example, in one embodiment, sources characterized by the highest data transmission rates (bit rate) are assigned to first layer 212 and third layer 216, and the remaining sources are assigned to second layer 214 and fourth layer 218; alternatively, 10 sources characterized by the highest data transmission rates may be assigned to first layer 212, and the remaining sources may be assigned to second layer 214, third layer 216 and fourth layer 218 based upon some other criteria (e.g., source bit rate precision levels). In another embodiment, sources characterized by the highest bit rate precision level are assigned to first layer 212 and third layer 216, and the remaining sources are assigned to second layer 214 and fourth layer 218; alternatively, sources characterized by the highest bit rate precision levels may be assigned to first layer 212, and the remaining sources may be assigned to second layer 214, third layer 216 and fourth layer 218 based upon some other criteria (e.g., source bit rate). The numbers of sources assigned to first layer 212 may be restricted to achieve manageable implementation complexity. The number of sources assigned to first layer 212 may be fixed or may vary over time.

In FIG. 5A, partitioner 210 has partitioned sources A–C, D–F, U–W, X–Z into four groups 220, 222, 224, 226, with sources A–C assigned to first layer 212, sources D-F assigned to second layer 214, sources U–W assigned to third layer 216, and sources X–Z assigned to fourth layer 218.

A bit rate controller 227 specifies the bit rates and the bit rate precision levels of sources A–C, D–F, U–W, X–Z, and delivers this information to partitioner 30 and to the schedulers (discussed below). In one embodiment, bit rate controller 227 assigns the same bit rate precision level to each source. In another embodiment, bit rate controller 227 assigns different bit rate precision levels to the sources. For example, audio sources maybe assigned relatively high bit rate precision levels, video sources may be assigned intermediate bit rate precision levels, and data sources may be assigned relatively low bit rate precision levels.

First layer 212 includes an entry 228–232 for each source assigned to first layer 212. Second layer 214 includes an entry 234–238 for each source assigned to second layer 214. Third layer 1216 includes an entry 240–244 for each source assigned to third layer 216. Fourth layer 218 includes an entry 246–250 for each source assigned to third layer 218.

Multiplexer 12 also includes first, second, third and fourth layer schedulers 252-258. First layer scheduler 252 is configured to schedule sources A–C represented by entries 228–232 in first layer 212 for assignment to a representative entry 260 ($\phi_1$) of a first intermediate scheduler 262. In one embodiment, first layer scheduler 212 schedules sources for assignment based upon a variable bit rate scheduling method (e.g., the virtual clock method, the round robin method, or the first-in-first-out (FIFO) method; mentioned above). Second layer scheduler 254 is configured to schedule sources D–F represented by entries 234–238 in second layer 214 for assignment to a representative entry 264 ($\phi_2$) of first intermediate scheduler 262. In one embodiment, second layer scheduler 254 schedules sources for output based upon a variable bit rate scheduling method, such as one of the methods mentioned in connection with first layer scheduler 252. Third layer scheduler 256 is configured to schedule sources U–W represented by entries 240–244 in third layer 216 for assignment to a representative entry 266 ($\phi_3$) of a second intermediate scheduler 268. In one embodiment, third layer scheduler 256 schedules sources for assignment based upon a variable bit rate scheduling method (e.g., the virtual clock method, the round robin method, or the first-in-first-out (FIFO) method; mentioned above). Fourth layer scheduler 258 is configured to schedule sources X–Z represented by entries 246-250 in fourth layer 218 for assignment to a representative entry 270 ($\phi_4$) of second intermediate scheduler 268. In one embodiment, fourth layer scheduler 258 schedules sources for output based upon a variable bit rate scheduling method, such as one of the methods discussed above in connection with first layer scheduler 252. First and second intermediate schedulers 262, 268 are configured to respectively schedule representative entries 260, 264 and 266, 270 for assignment to representative entries 272, 274 of a final scheduler 276, which is configured to schedule representative entries 272, 274 for output to communication channel 14. First and second intermediate schedulers 262, 268 and final scheduler 276 may schedule sources based upon the same or different variable bit rate scheduling methods.

In one embodiment, partitioner 210 is configured to assign sources A–F, U–Z to scheduling layers 212–218 based upon a fixed assignment method that operates independently of changes in the data transmission rates of the sources. For example, sources that are known in advance to be characterized by a relatively high bit rate may be permanently assigned to first layer 212 and third layer 216, and all of the remaining sources may be permanently assigned to second layer 214 and fourth layer 218, with the assignment to either second layer 214 or fourth layer 218 being based on one or more criterion which may or may not depend upon source bit rate.

In another embodiment, partitioner 210 is configured to assign sources A–F, U–Z to scheduling layers 212-218 based upon a dynamic assignment method that responds to changes in the data transmission rates of the sources. For example, partitioner 210 may dynamically assign sources with the highest bit rates to first layer 212 and third layer 216, and partition the remaining sources between second layer 214 and fourth layer 218. Thus, the assignments of each of the sources may change over time depending upon changes in the bit rates of each of the sources. In one embodiment, the numbers of sources assigned to each of first layer 212 and third layer 216 are fixed. In another embodiment, sources with bit rates that are greater than a first threshold value are assigned to first layer 212, and sources with bit rates that are between the first threshold value and a second threshold value are assigned to third layer 216; in which case the numbers of sources assigned to layers 212–218 may vary over time. In another embodiment, a sufficient number of the highest bit rate sources are assigned to first layer 212 so that the sum of the bit rates of the first layer sources just exceeds a threshold value.

Figure 5B:
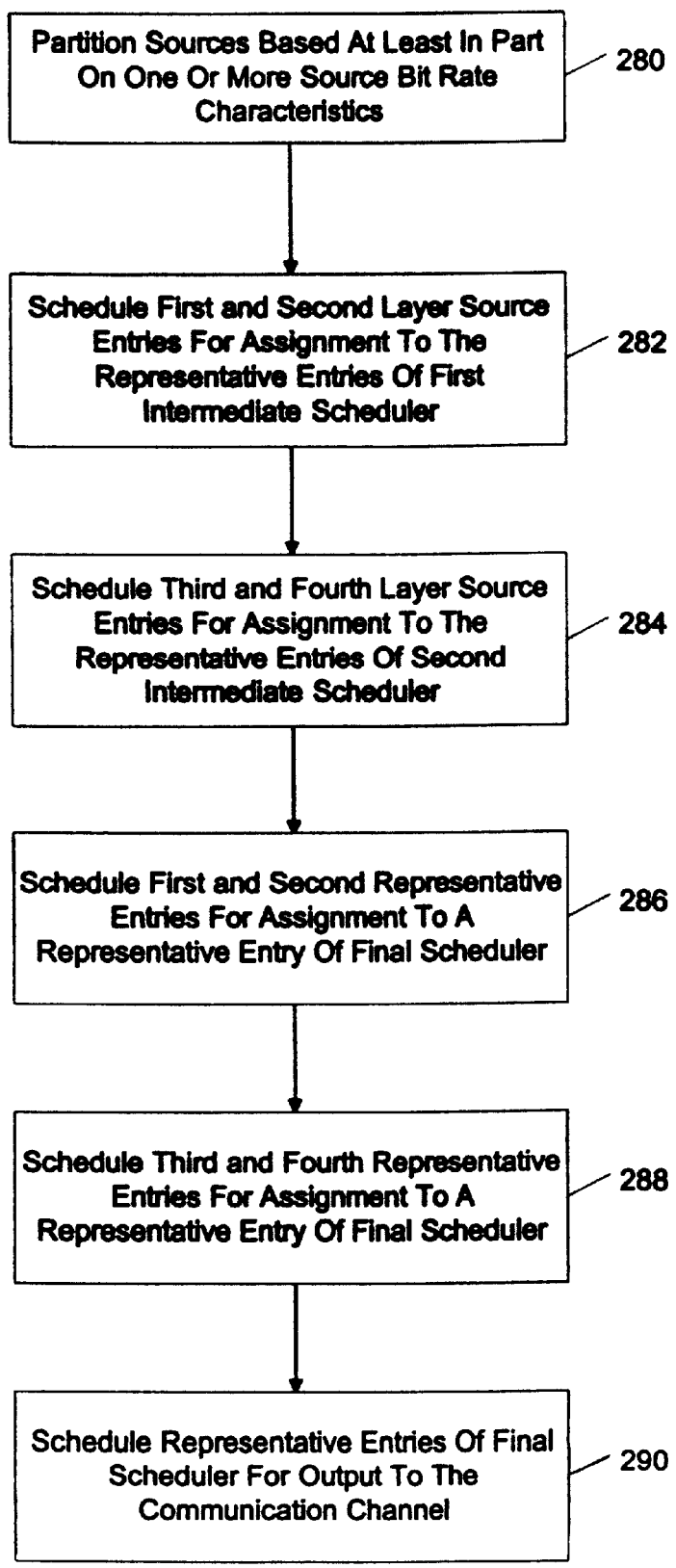
FIG. 5B is a flow diagram of a method of multiplexing data to a communication channel.

As shown in FIG. 5B, the multiplexer of FIG. 5A is operable to choreograph the multiplexing data to communication channel 14 as follows. Referring to FIGS. 5A and 5B, partitioner 210 partitions sources based at least upon one or more bit rate characteristics of the sources (step 280). First layer scheduler 252 schedules first layer sources entries 228–232 for assignment to representative entry 260 ($\phi_1$) and second layer scheduler 254 schedules second layer sources entries 234–238 for assignment to representative entry 264 ($\phi_2$) (step 282). Third layer scheduler 256 schedules third layer sources entries 240–244 for assignment to representative entry 266 ($\phi_3$) and fourth layer scheduler 258 schedules fourth layer sources entries 246–250 for assignment to representative entry 270 ($\phi_4$) (step 284). First intermediate scheduler 262 schedules first and second representative entries 260, 264 for assignment to representative entry 272 ($\phi_5$) of final scheduler 276 (step 286). Second intermediate scheduler 268 schedules third and fourth representative entries 266, 270 for assignment to representative entry 274 ($\phi_6$) of final scheduler 276 (step 288). Final scheduler 276 then schedules representative entries 272, 274 for output to communication channel 14 (step 290).

Still other embodiments are within the scope of the claims.

What is claimed is:

1. An apparatus for multiplexing data received from a plurality of sources to a communication channel, comprising a partitioner configured to assign each of the sources to one of at least two scheduling layers, including a first layer and a second layer, based (1) upon a fixed assignment method that operates independently of changes in data transmission rates of the sources; and (2) at least in part upon one or more bit rate characteristics of the sources.

2. The apparatus of claim 1, wherein the partitioner is configured to assign each of the sources based at least in part on data transmission rates of the sources.

3. The apparatus of claim 1, wherein the partitioner is configured to assign each of the sources based at least in part upon bit rate precision levels of the sources.

4. The apparatus of claim 1, wherein the number of sources assigned to the first layer is variable.

5. The apparatus of claim 1, wherein the first layer comprises an entry for each source assigned to the first layer and an entry representative of a source assigned to the second layer, and the second layer comprises an entry for each source assigned to the second layer.

6. The apparatus of claim 5, further comprising a first layer scheduler configured to schedule the sources represented by entries in the first layer for output to the communication channel.

7. The apparatus of claim 6, wherein the first layer scheduler is configured to schedule sources for output based upon a variable bit rate scheduling method.

8. The apparatus of claim 5, wherein the partitioner is configured to assign to the first layer sources with relatively high bit rates.

9. The apparatus of claim 5, wherein the partitioner is configured to assign to the first layer sources with relatively high bit rate precision levels.

10. The apparatus of claim 5, further comprising a second layer scheduler configured to schedule the sources represented by entries in the second layer for assignment to the representative entry of the first layer.

11. The apparatus of claim 10, wherein the second layer scheduler is configured to schedule sources for assignment to the representative entry of the first layer based upon a variable bit rate scheduling method.

12. The apparatus of claim 5, wherein the partitioner is configured to assign each of the sources to one of three or more scheduling layers, including the first layer, the second layer and a sequence of one or more lower layers, based at least in part on one or more bit rate characteristics of the sources.

13. The apparatus of claim 12, wherein
the second layer comprises, in addition to an entry for each source assigned to the second layer, an entry representative of a source assigned to a first of the one or more lower layers, and
each lower layer comprises an entry for each source assigned to that lower layer and an entry representative of a source assigned to the next lower layer in the sequence of one or more lower layers.

14. The apparatus of claim 13, further comprising a lower layer scheduler for the first of the one or more lower layers that is configured to schedule the sources represented by entries in that first lower layer for assignment to the representative entry of the second layer.

15. The apparatus of claim 12, wherein
the first layer comprises, in addition to the entry for each source assigned to the first layer and the entry representative of a source assigned to the second layer, a representative entry for each of the lower layers, and
each lower layer comprises an entry for each source assigned to that lower layer.

16. The apparatus of claim 15, further comprising a lower layer scheduler for each of the lower layers that is configured to schedule sources for assignment to the representative entries of the first layer.

17. The apparatus of claim 1, wherein
the partitioner is configured to assign each of the sources to one of three or more scheduling layers, including the first layer, the second layer and a third layer, based at least in part on one or more bit rate characteristics of the sources,
the first layer comprises an entry for each source assigned to the first layer,
the second layer comprises an entry for each source assigned to the second layer, and
the third layer comprises an entry representative of a source assigned to the first layer and an entry representative of a source assigned to the second layer.

18. The apparatus of claim 17, wherein the partitioner is configured to assign each of the sources based at least in part on the data transmission rates of the sources.

19. The apparatus of claim 17, wherein the partitioner is configured to assign each of the sources based at least in part on the bit rate precision levels of the sources.

20. The apparatus of claim 17, wherein the partitioner is configured to assign to the first layer sources with relatively high bit rates.

21. The apparatus of claim 17, wherein the partitioner is configured to assign to the first layer sources with relatively high bit rate precision levels.

22. The apparatus of claim 1, further comprising a bit rate controller configured to assign to each source a data transmission rate and a bit rate precision level.

23. The apparatus of claim 22, wherein the bit rate controller is configured to assign to each source the same bit rate precision level.

24. The apparatus of claim 22, wherein the bit rate controller is configured to assign different bit rate precision levels to the sources.

25. The apparatus of claim 24, wherein the bit rate controller is configured to assign relatively high bit rate precision levels to audio sources, intermediate bit rate precision levels to video sources, and relatively low bit rate precision levels to data sources.

26. An apparatus for multiplexing data received from a plurality of sources to a communication channel, comprising
a partitioner configured to assign each of the sources to one of at least two scheduling layers, including a first layer and a second layer, based at least in part upon one or more bit rate characteristics of the sources, and wherein the partitioner is configured to assign the sources to the scheduling layers based upon a dynamic assignment method that responds to changes in data transmission rates of the sources.

27. The apparatus of claim 26, wherein the partitioner is configured to assign each of the sources based at least in part on data transmission rates of the sources.

28. The apparatus of claim 26, wherein the partitioner is configured to assign each of the sources based at least in part upon bit rate precision levels of the sources.

29. The apparatus of claim 26, wherein the number of sources assigned to the first layer is variable.

30. The apparatus of claim 26, wherein the first layer comprises an entry for each source assigned to the first layer and an entry representative of a source assigned to the second layer, and the second layer comprises an entry for each source assigned to the second layer.

31. The apparatus of claim 30, further comprising a first layer scheduler configured to schedule the sources represented by entries in the first layer for output to the communication channel.

32. The apparatus of claim 31, wherein the first layer scheduler is configured to schedule sources for output based upon a variable bit rate scheduling method.

33. The apparatus of claim 30, wherein the partitioner is configured to assign to the first layer sources with relatively high bit rates.

34. The apparatus of claim 30, wherein the partitioner is configured to assign to the first layer sources with relatively high bit rate precision levels.

35. The apparatus of claim 30, further comprising a second layer scheduler configured to schedule the sources represented by entries in the second layer for assignment to the representative entry of the first layer.

36. The apparatus of claim 35, wherein the second layer scheduler is configured to schedule sources for assignment to the representative entry of the first layer based upon a variable bit rate scheduling method.

37. The apparatus of claim 36, wherein
the first layer comprises, in addition to the entry for each source assigned to the first layer and the entry representative of a source assigned to the second layer, a representative entry for each of the lower layers, and
each lower layer comprises an entry for each source assigned to that lower layer.

38. The apparatus of claim 37, further comprising a lower layer scheduler for each of the lower layers that is configured to schedule sources for assignment to the representative entries of the first layer.

39. The apparatus of claim 30, wherein the partitioner is configured to assign each of the sources to one of three or more scheduling layers, including the first layer, the second layer and a sequence of one or more lower layers, based at least in part on one or more bit rate characteristics of the sources.

40. The apparatus of claim 39, wherein
the second layer comprises, in addition to an entry for each source assigned to the second layer, an entry representative of a source assigned to a first of the one or more lower layers, and
each lower layer comprises an entry for each source assigned to that lower layer and an entry representative of a source assigned to the next lower layer in the sequence of one or more lower layers.

41. The apparatus of claim 40, further comprising a lower layer scheduler for the first of the one or more lower layers that is configured to schedule the sources represented by entries in that first lower layer for assignment to the representative entry of the second layer.

42. The apparatus of claim 26, wherein
the partitioner is configured to assign each of the sources to one of three or more scheduling layers, including the first layer, the second layer and a third layer, based at least in part on one or more bit rate characteristics of the sources,
the first layer comprises an entry for each source assigned to the first layer,
the second layer comprises an entry for each source assigned to the second layer, and
the third layer comprises an entry representative of a source assigned to the first layer and an entry representative of a source assigned to the second layer.

43. The apparatus of claim 42, wherein the partitioner is configured to assign each of the sources based at least in part on the data transmission rates of the sources.

44. The apparatus of claim 42, wherein the partitioner is configured to assign each of the sources based at least in part on the bit rate precision levels of the sources.

45. The apparatus of claim 42, wherein the partitioner is configured to assign to the first layer sources with relatively high bit rates.

46. The apparatus of claim 42, wherein the partitioner is configured to assign to the first layer sources with relatively high bit rate precision levels.

47. The apparatus of claim 26 further comprising a bit rate controller configured to assign to each source a data transmission rate and a bit rate precision level.

48. The apparatus of claim 47, wherein the bit rate controller is configured to assign to each source the same bit rate precision level.

49. The apparatus of claim 47, wherein the bit rate controller is configured to assign different bit rate precision levels to the sources.

50. The apparatus of claim 49, wherein the bit rate controller is configured to assign relatively high bit rate precision levels to audio sources, intermediate bit rate precision levels to video sources, and relatively low bit rate precision levels to data sources.

51. An apparatus for multiplexing data received from a plurality of sources to a communication channel, comprising
a partitioner configured to assign each of the sources to one of at least two scheduling layers, including a first layer and a second layer, wherein the number of sources assigned to the first layer is fixed.

52. The apparatus of claim 51, wherein the partitioner is configured to assign each of the sources based at least in part on data transmission rates of the sources.

53. The apparatus of claim 51, wherein the partitioner is configured to assign each of the sources based at least in part upon bit rate precision levels of the sources.

54. The apparatus of claim 51, wherein the first layer comprises an entry for each source assigned to the first layer and an entry representative of a source assigned to the second layer, and the second layer comprises an entry for each source assigned to the second layer.

55. The apparatus of claim 54, further comprising a first layer scheduler configured to schedule the sources represented by entries in the first layer for output to the communication channel.

56. The apparatus of claim 55, wherein the first layer scheduler is configured to schedule sources for output based upon a variable bit rate scheduling method.

57. The apparatus of claim 54, wherein the partitioner is configured to assign to the first layer sources with relatively high bit rates.

58. The apparatus of claim 54, wherein the partitioner is configured to assign to the first layer sources with relatively high bit rate precision levels.

59. The apparatus of claim 54, further comprising a second layer scheduler configured to schedule the sources represented by entries in the second layer for assignment to the representative entry of the first layer.

60. The apparatus of claim 59, wherein the second layer scheduler is configured to schedule sources for assignment to the representative entry of the first layer based upon a variable bit rate scheduling method.

61. The apparatus of claim 54, wherein the partitioner is configured to assign each of the sources to one of three or more scheduling layers, including the first layer, the second layer and a sequence of one or more lower layers, based at least in part on one or more bit rate characteristics of the sources.

62. The apparatus of claim 61, wherein
the second layer comprises, in addition to an entry for each source assigned to the second layer, an entry representative of a source assigned to a first of the one or more lower layers, and
each lower layer comprises an entry for each source assigned to that lower layer and an entry representative of a source assigned to the next lower layer in the sequence of one or more lower layers.

63. The apparatus of claim 62, further comprising a lower layer scheduler for the first of the one or more lower layers that is configured to schedule the sources represented by entries in that first lower layer for assignment to the representative entry of the second layer.

64. The apparatus of claim 61, wherein
the first layer comprises, in addition to the entry for each source assigned to the first layer and the entry representative of a source assigned to the second layer, a representative entry for each of the lower layers, and
each lower layer comprises an entry for each source assigned to that lower layer.

65. The apparatus of claim 64, further comprising a lower layer scheduler for each of the lower layers that is configured to schedule sources for assignment to the representative entries of the first layer.

66. The apparatus of claim 51, wherein
the partitioner is configured to assign each of the sources to one of three or more scheduling layers, including the first layer, the second layer and a third layer, based at least in part on one or more bit rate characteristics of the sources,
the first layer comprises an entry for each source assigned to the first layer,
the second layer comprises an entry for each source assigned to the second layer, and
the third layer comprises an entry representative of a source assigned to the first layer and an entry representative of a source assigned to the second layer.

67. The apparatus of claim 66, wherein the partitioner is configured to assign each of the sources based at least in part on the data transmission rates of the sources.

68. The apparatus of claim 66, wherein the partitioner is configured to assign each of the sources based at least in part on the bit rate precision levels of the sources.

69. The apparatus of claim 66, wherein the partitioner is configured to assign to the first layer sources with relatively high bit rates.

70. The apparatus of claim 66, wherein the partitioner is configured to assign to the first layer sources with relatively high bit rate precision levels.

71. The apparatus of claim 51, further comprising a bit rate controller configured to assign to each source a data transmission rate and a bit rate precision level.

72. The apparatus of claim 71, wherein the bit rate controller is configured to assign to each source the same bit rate precision level.

73. The apparatus of claim 71, wherein the bit rate controller is configured to assign different bit rate precision levels to the sources.

74. The apparatus of claim 73, wherein the bit rate controller is configured to assign relatively high bit rate precision levels to audio sources, intermediate bit rate precision levels to video sources, and relatively low bit rate precision levels to data sources.

75. A method for multiplexing data received from a plurality of sources to a communication channel, comprising
assigning each of the sources to one of at least two scheduling layers, including a first layer and a second layer based (1) upon a fixed assignment method that operates independently of changes in data transmission rates of the sources; and (2) at least in part upon one or more bit rate characteristics of the sources.

76. The method of claim 75, wherein each of the sources is assigned based at least in part upon data transmission rates of the sources.

77. The method of claim 75, wherein each of the sources is assigned based at least in part upon bit rate precision levels of the sources.

78. The method of claim 75, wherein the number of sources assigned to the first layer is variable.

79. The method of claim 75, wherein the first layer comprises an entry for each source assigned to the first layer and an entry representative of a source assigned to the second layer, and the second layer comprises an entry for each source assigned to the second layer.

80. The method of claim 79, further comprising scheduling the sources represented by entries in the first layer for output to the communication channel.

81. The method of claim 80, wherein the sources represented by entries in the first layer are scheduled for output based upon a variable bit rate scheduling method.

82. The method of claim 79, wherein sources with relatively high bit rates are assigned to the first layer.

83. The method of claim 79, wherein sources with relatively high bit rate precision levels are assigned to the first layer.

84. The method of claim 79, further comprising scheduling the sources represented by entries in the second layer for assignment to the representative entry of the first layer.

85. The method of claim 84, wherein the sources represented by entries in the second layer are scheduled sources for assignment to the representative entry of the first layer based upon a variable bit rate scheduling method.

86. The method of claim 79, wherein each of the sources is assigned to one of three or more scheduling layers, including the first layer, the second layer and a sequence of one or more lower layers, based at least in part upon one or more bit rate characteristics of the sources.

87. The method of claim 86, wherein
the second layer comprises, in addition to an entry for each source assigned to the second layer, an entry representative of a source assigned to a first of the one or more lower layers, and
each lower layer comprises an entry for each source assigned to that lower layer and an entry representative of a source assigned to the next lower layer in the sequence of one or more lower layers.

88. The method of claim 87, further comprising scheduling the sources represented by entries in that first lower layer for assignment to the representative entry of the second layer.

89. The apparatus of claim 86, wherein
the first layer comprises, in addition to the entry for each source assigned to the first layer and the entry representative of a source assigned to the second layer, a representative entry for each of the lower layers, and
each lower layer comprises an entry for each source assigned to that lower layer.

90. The method of claim 89, further comprising scheduling sources for assignment to the representative entries of the first layer.

91. The method of claim 75, wherein
each of the sources is assigned to one of three or more scheduling layers, including the first layer, the second layer and a third layer, based at least in part upon one or more bit rate characteristics of the sources,
the first layer comprises an entry for each source assigned to the first layer,
the second layer comprises an entry for each source assigned to the second layer, and
the third layer comprises an entry representative of a source assigned to the first layer and an entry representative of a source assigned to the second layer.

92. The method of claim 91, wherein each of the sources is assigned based at least in part upon the data transmission rates of the sources.

93. The method of claim 91, wherein each of the sources is assigned based at least in part upon the bit rate precision levels of the sources.

94. The method of claim 91, wherein sources with relatively high bit rates are assigned to the first layer.

95. The method of claim 91, wherein sources with relatively high bit rate precision levels are assigned to the first layer.

96. The method of claim 75, further comprising assigning to each source a data transmission rate and a bit rate precision level.

97. The method of claim 96, wherein the same bit rate precision level is assigned to each source.

98. The method of claim 96, wherein different bit rate precision levels are assigned to the sources.

99. The method of claim 98, wherein relatively high bit rate precision levels are assigned to audio sources, intermediate bit rate precision levels are assigned to video sources, and relatively low bit rate precision levels are assigned to data sources.

100. A method for multiplexing data received from a plurality of sources to a communication channel, comprising
assigning each of the sources to one of at least two scheduling layers, including a first layer and a second layer, based at least in part upon one or more bit rate characteristics of the sources, and wherein the sources are assigned to the scheduling layers based upon a dynamic assignment method that responds to changes in data transmission rates of the sources.

101. The method of claim 100, wherein the partitioner is configured to assign each of the sources based at least in part on data transmission rates of the sources.

102. The method of claim 100, wherein the partitioner is configured to assign each of the sources based at least in part upon bit rate precision levels of the sources.

103. The method of claim 100, wherein the number of sources assigned to the first layer is variable.

104. The method of claim 100, wherein the first layer comprises an entry for each source assigned to the first layer and an entry representative of a source assigned to the second layer, and the second layer comprises an entry for each source assigned to the second layer.

105. The method of claim 104, further comprising a first layer scheduler configured to schedule the sources represented by entries in the first layer for output to the communication channel.

106. The method of claim 105, wherein the first layer scheduler is configured to schedule sources for output based upon a variable bit rate scheduling method.

107. The method of claim 104, wherein the partitioner is configured to assign to the first layer sources with relatively high bit rates.

108. The method of claim 104, wherein the partitioner is configured to assign to the first layer sources with relatively high bit rate precision levels.

109. The method of claim 104, further comprising a second layer scheduler configured to schedule the sources represented by entries in the second layer for assignment to the representative entry of the first layer.

110. The method of claim 109, wherein the second layer scheduler is configured to schedule sources for assignment to the representative entry of the first layer based upon a variable bit rate scheduling method.

111. The method of claim 110, wherein
the first layer comprises, in addition to the entry for each source assigned to the first layer and the entry representative of a source assigned to the second layer, a representative entry for each of the lower layers, and
each lower layer comprises an entry for each source assigned to that lower layer.

112. The method of claim 111, further comprising a lower layer scheduler for each of the lower layers that is configured to schedule sources for assignment to the representative entries of the first layer.

113. The method of claim 104, wherein the partitioner is configured to assign each of the sources to one of three or more scheduling layers, including the first layer, the second layer and a sequence of one or more lower layers, based at least in part on one or more bit rate characteristics of the sources.

114. The method of claim 113, wherein
the second layer comprises, in addition to an entry for each source assigned to the second layer, an entry representative of a source assigned to a first of the one or more lower layers, and
each lower layer comprises an entry for each source assigned to that lower layer and an entry representative of a source assigned to the next lower layer in the sequence of one or more lower layers.

115. The method of claim 114, further comprising a lower layer scheduler for the first of the one or more lower layers that is configured to schedule the sources represented by entries in that first lower layer for assignment to the representative entry of the second layer.

116. The method of claim 100, wherein
the partitioner is configured to assign each of the sources to one of three or more scheduling layers, including the first layer, the second layer and a third layer, based at least in part on one or more bit rate characteristics of the sources,
the first layer comprises an entry for each source assigned to the first layer,
the second layer comprises an entry for each source assigned to the second layer, and
the third layer comprises an entry representative of a source assigned to the first layer and an entry representative of a source assigned to the second layer.

117. The method of claim 116, wherein the partitioner is configured to assign each of the sources based at least in part on the data transmission rates of the sources.

118. The method of claim 116, wherein the partitioner is configured to assign each of the sources based at least in part on the bit rate precision levels of the sources.

119. The method of claim 116, wherein the partitioner is configured to assign to the first layer sources with relatively high bit rates.

120. The method of claim 116, wherein the partitioner is configured to assign to the first layer sources with relatively high bit rate precision levels.

121. The method of claim 100, further comprising a bit rate controller configured to assign to each source a data transmission rate and a bit rate precision level.

122. The method of claim 121, where in the bit rate controller is configured to assign to each source the same bit rate precision level.

123. The method of claim 121, wherein the bit rate controller is configured to assign different bit rate precision levels to the sources.

124. The method of claim 123, wherein the bit rate controller is configured to assign relatively high bit rate precision levels to audio sources, intermediate bit rate precision levels to video sources, and relatively low bit rate precision levels to data sources.

125. A method for multiplexing data received from a plurality of sources to a communication channel, comprising
assigning each of the sources to one of at least two scheduling layers, including a first layer and a second layer, wherein the number of sources assigned to the first layer is fixed.

126. The method of claim 125, wherein the partitioner is configured to assign each of the sources based at least in part on data transmission rates of the sources.

127. The method of claim 125, wherein the partitioner is configured to assign each of the sources based at least in part upon bit rate precision levels of the sources.

128. The method of claim 125, wherein the first layer comprises an entry for each source assigned to the first layer and an entry representative of a source assigned to the second layer, and the second layer comprises an entry for each source assigned to the second layer.

129. The method of claim 128, further comprising a first layer scheduler configured to schedule the sources represented by entries in the first layer for output to the communication channel.

130. The method of claim 129, wherein the first layer scheduler is configured to schedule sources for output based upon a variable bit rate scheduling method.

131. The method of claim 128, wherein the partitioner is configured to assign to the first layer sources with relatively high bit rates.

132. The method of claim 128, wherein the partitioner is configured to assign to the first layer sources with relatively high bit rate precision levels.

133. The method of claim 128, further comprising a second layer scheduler configured to schedule the sources represented by entries in the second layer for assignment to the representative entry of the first layer.

134. The method of claim 133, wherein the second layer scheduler is configured to schedule sources for assignment to the representative entry of the first layer based upon a variable bit rate scheduling method.

135. The method of claim 128, wherein the partitioner is configured to assign each of the sources to one of three or more scheduling layers, including the first layer, the second layer and a sequence of one or more lower layers, based at least in part on one or more bit rate characteristics of the sources.

136. The method of claim 135, wherein
the second layer comprises, in addition to an entry for each source assigned to the second layer, an entry representative of a source assigned to a first of the one or more lower layers, and
each lower layer comprises an entry for each source assigned to that lower layer and an entry representative of a source assigned to the next lower layer in the sequence of one or more lower layers.

137. The method of claim 136, further comprising a lower layer scheduler for the first of the one or more lower layers that is configured to schedule the sources represented by entries in that first lower layer for assignment to the representative entry of the second layer.

138. The method of claim 135, wherein
the first layer comprises, in addition to the entry for each source assigned to the first layer and the entry representative of a source assigned to the second layer, a representative entry for each of the lower layers, and
each lower layer comprises an entry for each source assigned to that lower layer.

139. The method of claim 138, further comprising a lower layer scheduler for each of the lower layers that is configured to schedule sources for assignment to the representative entries of the first layer.

140. The method of claim 125, wherein
the partitioner is configured to assign each of the sources to one of three or more scheduling layers, including the first layer, the second layer and a third layer, based at least in part on one or more bit rate characteristics of the sources, the first layer comprises an entry for each source assigned to the first layer, the second layer comprises an entry for each source assigned to the second layer, and the third layer comprises an entry representative of a source assigned to the first layer and an entry representative of a source assigned to the second layer.

141. The method of claim 140, wherein the partitioner is configured to assign each of the sources based at least in part on the data transmission rates of the sources.

142. The method of claim 140, wherein the partitioner is configured to assign each of the sources based at least in part on the bit rate precision levels of the sources.

143. The method of claim 140, wherein the partitioner is configured to assign to the first layer sources with relatively high bit rates.

144. The method of claim 140, wherein the partitioner is configured to assign to the first layer sources with relatively high bit rate precision levels.

145. The method of claim 125, further comprising a bit rate controller configured to assign to each source a data transmission rate and a bit rate precision level.

146. The method of claim 145, wherein the bit rate controller is configured to assign to each source the same bit rate precision level.

147. The method of claim 145, wherein the bit rate controller is configured to assign different bit rate precision levels to the sources.

148. The method of claim 147, wherein the bit rate controller is configured to assign relatively high bit rate precision levels to audio sources, intermediate bit rate precision levels to video sources, and relatively low bit rate precision levels to data sources.

* * * * *

UNITED STATES PATENT AND TRADEMARK OFFICE
CERTIFICATE OF CORRECTION

PATENT NO.    : 6,490,298 B1
DATED         : December 3, 2002
INVENTOR(S)   : Chin et al.

It is certified that error appears in the above-identified patent and that said Letters Patent is hereby corrected as shown below:

<u>Title page,</u>
Item [56], U.S. PATENT DOCUMENTS, "6,373,818", replace "4/2000" with -- 4/2002 --;
OTHER PUBLICATIONS, 1st publication, before "CA" insert -- Berkeley, --;

<u>Column 4,</u>
Line 27, replace "A-" with -- A-C --;

<u>Column 8,</u>
Line 2, after "158," delete "30";

<u>Column 9,</u>
Line 45, after "alternatively," delete "10"; and

<u>Column 19,</u>
Line 51, replace "where in" with -- wherein --.

Signed and Sealed this

Twelfth Day of August, 2003

JAMES E. ROGAN
*Director of the United States Patent and Trademark Office*